April 19, 1966  T. HARMS  3,246,811
END GATE CONSTRUCTION
Filed Aug. 19, 1964

INVENTOR.
Theodore Harms
BY
Sam J. Slotiky
ATTORNEY

United States Patent Office 3,246,811
Patented Apr. 19, 1966

3,246,811
END GATE CONSTRUCTION
Theodore Harms, George, Iowa
Filed Aug. 19, 1964, Ser. No. 390,581
6 Claims. (Cl. 222—502)

My invention relates to an end gate construction.

An object of my invention is to provide an end gate which can be easily and quickly opened.

A further object of my invention is to provide an end gate which can be opened to a pre-determined distance thereby providing a method for controlling the flow of grain out of a wagon or truck body.

A further object of my invention is to provide an arrangement which operates in a positive manner and which closes both sides of the end gate or opens both sides simultaneously in a uniform and efficient manner.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1:
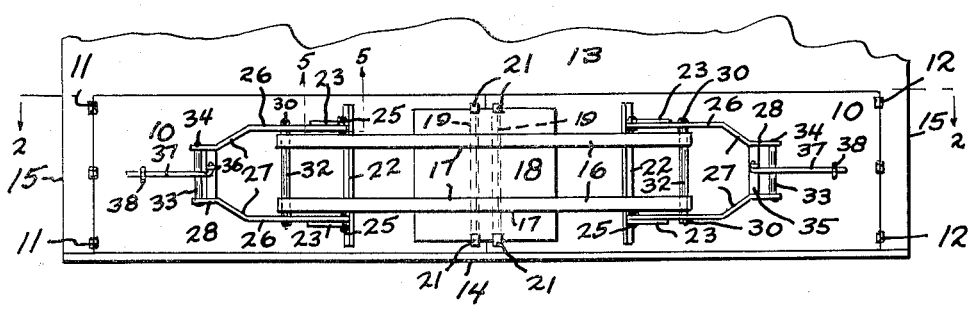
FIGURE 1 is a rear elevation showing my device.

In describing my invention, I have used the character 10 to designate a pair of end gate members hinged as at 11 and 12 in any desired manner to the rear wall 13 of a wagon or vehicle box, the character 14 designating the floor of the box and the character 15 indicating side walls.

I have further used the character 16 to indicate a pair of vertically spaced square-in section tubes which are welded at 17 to a centrally positioned plate 18.

Figure 5:
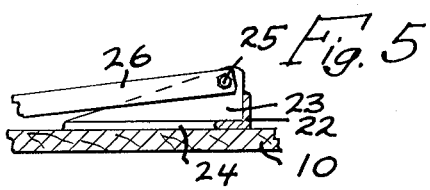
FIGURE 5 is a further enlarged detail.
Figure 7:
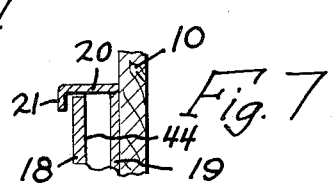
FIGURE 7 is a sectional view of FIGURE 3 taken along the lines 7—7 thereof.

Attached to the members 10 are the vertically positioned angle members 19 and welded at either end of these members 19 are the retaining clips 20 having the inwardly turned lips 21 which are spaced slightly from the plate 18 (see FIG. 7). The character 22 indicates further angle members to which are welded the gussets 23 (see FIG. 5) which are further attached to the flat bracing members 24 which are attached to the members 10, and pivotally secured by the means of the bolts 25 to the members 23 are the arms 26 having the inwardly bent portions 27 which terminate in the further portions 28.

Figure 6:
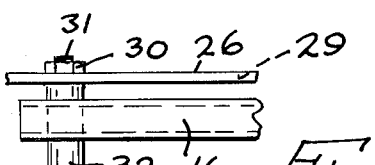
FIGURE 6 is a further enlarged detail.

The arms 26 include the lengthened slots 29 therein, and passing through the slots 29 are the securing bolts 30 which are attached to the threaded portions 31 which are attached at the ends of the transverse tubes 32, which tubes 32 pass through the square members 16 (see FIG. 6).

The portions 28 are secured to the tubular handle members 33 as at 34.

Figure 4:
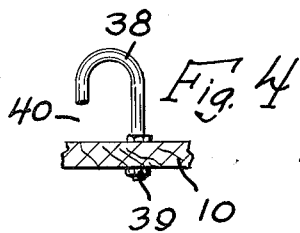
FIGURE 4 is a further enlarged detail.

The character 35 indicates straps attached to the members 10 which straps include the ears 36 through which ears are pivotally secured the ends of the rods 37, and the character 38 indicates substantially U-shaped members secured as at 39 (see FIG. 4) to the members 10, the character 40 indicating a passageway or opening whereby the rods 37 can be placed therein.

Figure 2:
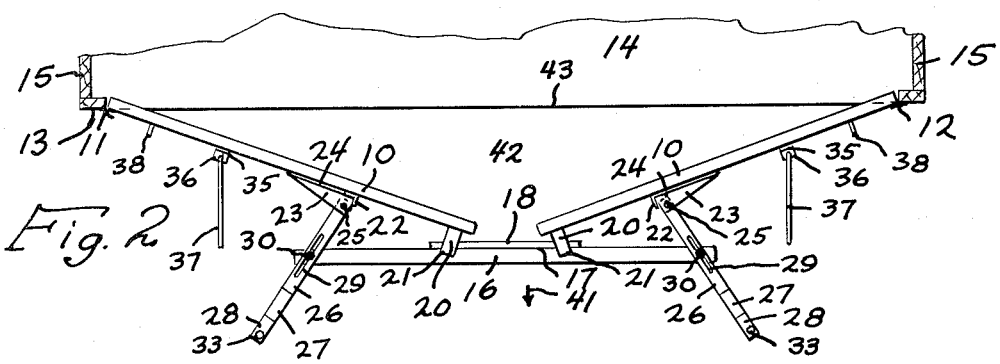
FIGURE 2 is a sectional view of FIGURE 1 taken substantially along the lines 2—2 thereof.
Figure 3:
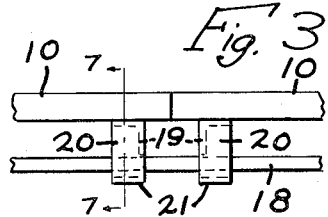
FIGURE 3 is an enlarged detail.

The device operates in the following manner. FIGURE 1 shows the arrangement in its fully closed position, and ready to discharge the grain. The rods 37 are drawn out of the openings 40 and released which unlocks the arrangement, and the handle members 33 are clasped and pulled toward the operator which correspondingly will swing the arms 26 which will cause the members 16 to move in the direction of the arrow 41 as shown in FIGURE 2, and the grain will then be discharged downwardly through the space 42 and adjacently to the rear edge 43 of the wagon box. During this action or movement, the plate 18 will slide along the edges 44 of the angle members 19 (see FIG. 7) and this arrangement will thereby maintain a tight closure so that the grain cannot escape laterally.

By firmly attaching the bolts 30 in desired position along the slots 29, the extent of opening of the arrangement can be adjusted, so as to allow escape of lesser or greater amounts of grain. For instance, as shown in FIGURE 2, if the bolts 30 were secured to the members 32 in positions further outwardly in the slots than shown, the members 10 would then open to a greater degree, etc.

After the discharge of the material, the handles 33 are forced back to the position shown in FIGURE 1 and the rods 37 are relocked within the members 38.

Any other type of locking arrangement, etc., can be used, and it will thus be noted that the arrangement above described provides all of the advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. An end gate construction comprising a pair of end gate members, said end gate members being hinged at their outer edges, a centrally positioned plate adapted to abut against the inner edges of said end gate members, means for moving said plate inwardly and outwardly to correspondingly close or open said end gate members, said means including vertically spaced laterally positioned bars attached to said plate, arms pivotally attached to said bars.

2. An end gate construction comprising a pair of end gate members, said end gate members being hinged at their outer edges, a centrally positioned plate adapted to abut against the inner edges of said end gate members, means for moving said plate inwardly and outwardly to correspondingly close or open said end gate members, said means including vertically spaced laterally positioned bars attached to said plate, arms pivotally attached to said bars, means for adjustably attaching said arms to said bars to thereby limit outward movement of said plate.

3. An end gate construction comprising a pair of end gate members, said end gate members being hinged at their outer edges, a centrally positioned plate adapted to abut against the inner edges of said end gate members, means for moving said plate inwardly and outwardly to correspondingly close or open said end gate members, said means including vertically spaced laterally positioned bars attached to said plate, arms pivotally attached to said bars, means for adjustably attaching said arms to said bars to thereby limit outward movement of said plate, said arms including handle portions at the outer extremities thereof.

4. An end gate construction comprising a pair of end gate members, said end gate members being hinged at their outer edges, a centrally positioned plate adapted to abut against the inner edges of said end gate members, means for moving said plate inwardly and outwardly to correspondingly close or open said end gate members, said means including vertically spaced laterally positioned bars attached to said plate, arms pivotally attached to said bars, means for adjustably attaching said arms to said bars to thereby limit outward movement of said plate, said arms including handle portions at the outer extremities thereof, means for locking said arms against said end gate members when said end gate members are in closed position.

5. An end gate construction comprising a pair of end gate members, said end gate members being hinged at their outer edges, a centrally positioned plate adapted to abut against the inner edges of said end gate members, means for moving said plate inwardly and outwardly to correspondingly close or open said end gate members, said means including vertically spaced laterally positioned bars attached to said plate, arms pivotally attached to said bars, means for adjustably attaching said arms to said bars to thereby limit outward movement of said plate, said arms including handle portions at the outer extremities thereof, means for locking said arms against said end gate members when said end gate members are in closed position, retaining members attached to the inner ends of said end gate members adapted to receive the upper and lower edges of said plate, angle members attached to said retaining members adapted to engage the inner surface of said plate.

6. An end gate construction comprising a pair of end gate members, said end gate members being hinged at their outer edges, a centrally positioned plate adapted to abut against the inner edges of said end gate members, means for moving said plate inwardly and outwardly to correspondingly close or open said end gate members, said means including vertically spaced laterally positioned bars attached to said plate, arms pivotally attached to said bars, means for adjustably attaching said arms to said bars to thereby limit outward movement of said plate, said arms including handle portions at the outer extremities thereof, means for locking said arms against said end gate members when said end gate members are in closed position, retaining members attached to the inner ends of said end gate members adapted to receive the upper and lower edges of said plate, angle members attached to said retaining members adapted to engage the inner surface of said plate, said adjustable attaching means including slots in said arms, transverse members having end extremities received in said slots, securing members attached to said end extremities.

References Cited by the Examiner
UNITED STATES PATENTS

| 948,365 | 2/1910 | Zoller | 294—71 |
| 1,612,590 | 12/1926 | Lucka et al. | 222—503 |

LOUIS J. DEMBO, *Primary Examiner.*

CHARLES R. CARTER, *Examiner.*